US 12,380,487 B2

(12) United States Patent
Frank (10) Patent No.: US 12,380,487 B2
(45) Date of Patent: Aug. 5, 2025

(54) METHOD, SYSTEM, AND NON-TRANSITORY COMPUTER READABLE MEDIUM FOR FRICTIONLESS SHOPPING USING EMITTED LIGHT SIGNALS

(71) Applicant: Toshiba Global Commerce Solutions Holdings Corporation, Tokyo (JP)

(72) Inventor: James L. Frank, Montreal (CA)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 211 days.

(21) Appl. No.: 17/695,643

(22) Filed: Mar. 15, 2022

(65) Prior Publication Data
US 2023/0298084 A1   Sep. 21, 2023

(51) Int. Cl.
*G06Q 30/0601* (2023.01)

(52) U.S. Cl.
CPC .............................. *G06Q 30/0633* (2013.01)

(58) Field of Classification Search
CPC ....... G01C 21/206; H04W 4/02; G06V 20/10; G06V 20/52; G06Q 30/0601–0645
USPC ................................................ 705/26.1–27.2
See application file for complete search history.

(56) References Cited

U.S. PATENT DOCUMENTS

| | | | |
|---|---|---|---|
| 9,692,990 B2 | 6/2017 | Beall et al. | |
| 11,488,231 B1 * | 11/2022 | Dsouza | G06V 20/62 |
| 2012/0105630 A1 | 5/2012 | Cao | |
| 2018/0357981 A1 * | 12/2018 | Ng | G06Q 30/0269 |
| 2020/0034812 A1 * | 1/2020 | Nemati | G06Q 20/14 |
| 2023/0146179 A1 * | 5/2023 | Hagen | G06Q 30/0609 |
| | | | 705/26.35 |

FOREIGN PATENT DOCUMENTS

WO   2004030560 A2   4/2004

OTHER PUBLICATIONS

Thibaut Raharijaona, et al. Local Positioning System Using Flickering Infrared LEDs. Nov. 3, 2017. Accessed via https://www.mdpi.com/1424-8220/17/11/2518 (Year: 2017).*
Elejalde-Ruiz, A. (2020). I just shopped amazon fresh in naperville, with checkout-free dash carts and alexa help. Here's how it works. (Year: 2020).*

* cited by examiner

*Primary Examiner* — Jeffrey A. Smith
*Assistant Examiner* — Ashley D Preston
(74) *Attorney, Agent, or Firm* — Patterson + Sheridan, LLP (57) ABSTRACT

The present disclosure provides a system and method for providing a frictionless shopping experience. The method includes detecting that an item was removed from a first area and detecting, by a camera, a light signal emitted from a cart. The method also includes identifying the cart based on the light signal and determining, based on the identified cart, a shopper linked to the cart. The method further includes determining, based at least in part on a location of the camera in the space, that the shopper removed the item from the first area and assigning the item to the shopper.

20 Claims, 5 Drawing Sheets

METHOD, SYSTEM, AND NON-TRANSITORY COMPUTER READABLE MEDIUM FOR FRICTIONLESS SHOPPING USING EMITTED LIGHT SIGNALS

BACKGROUND

Frictionless shopping systems typically use computer vision techniques to detect shoppers taking items for purchase in a shopping environment (e.g., a store). These computer vision systems continuously monitor videos of the store to track the movement and actions of shoppers. When the system detects that a shopper has taken an item, the system assigns the item to the shopper's account (e.g., adding the item to the shopper's virtual basket or cart). When the shopper leaves the store, the system automatically charges the shopper for the items in the virtual basket or cart. In this manner, the shopper need not engage in the conventional checkout process (e.g., wait in a checkout lane, scan items, and pay for items).

DETAILED DESCRIPTION

Conventional frictionless shopping systems use a large amount of resources to track shoppers in a store. For example, when there are a large number of shoppers in the store, a large amount of computing resources is needed to distinguish and track each of the shoppers. As another example, the larger the store space, the more cameras and computing resources are needed to monitor the shoppers in the space. The large amount of resources used by frictionless shopping systems makes them difficult to implement and maintain.

This disclosure describes a frictionless shopping system that uses a light emission and detection feature to monitor and track shoppers. In embodiments herein, shopping carts and shopping baskets in a store are equipped with a light (e.g., a light emitting diode) that emits light signals (e.g., infrared light signals) that identify the shopping cart or basket. A camera array positioned on the ceiling of the store detects the emitted light signals and indicates these detected light signals to a computer system. The computer system deciphers the light signals to identify the shopping cart or basket and the shopper linked to that shopping cart or basket. Then, based on the location of the camera in the camera array, the computer system determines the approximate location of the shopper in the store.

This process may be repeated to easily track the locations of shoppers in the store, or the process may be triggered by an event for a particular region in the store. For example, when the computer system detects that an item has been removed from a shelf (e.g., a weight sensor detects that the weight of the shelf was reduced), the computer system may use the camera array and the emitted light signals to determine which shoppers are near the shelf. The computer system may then assign the removed item to the virtual basket or cart of the shopper that is closest to the shelf. In this manner, the computer system does not need to rely on computer vision techniques, which reduces the amount of computing resources and hardware resources needed to implement frictionless shopping.

In some embodiments, the computer system also uses computer vision to analyze videos captured by cameras in the store to validate the determination of which user took the item from the shelf. In this manner, the computer vision techniques used to implement frictionless shopping are used as a validation check rather than continuously, which reduces the amount of resources (e.g., hardware resources and computing resources) needed to implement frictionless shopping.

Advantages of the Computer System

The computer system reduces the resources (e.g., hardware and computing resources) needed to implement a frictionless shopping system, in certain embodiments. Specifically, the computer system uses light signals emitted from shopping carts or shopping baskets to track the location of shoppers within a store. As a result, the computer system does not rely solely on resource-intensive computer vision techniques to track and monitor the shoppers in the store. Thus, the computer system greatly reduces the amount of resources needed to implement frictionless shopping relative to systems that rely on computer vision to track and monitor shoppers, in certain embodiments.

Additionally, because the computer system need not continuously monitor the movements or actions of shoppers, the cameras need not provide visual coverage of the entire space and so, fewer cameras are needed. In this manner, the computer system also reduces the amount of hardware resources needed to implement the frictionless shopping experience, in certain embodiments.

Figure 1:
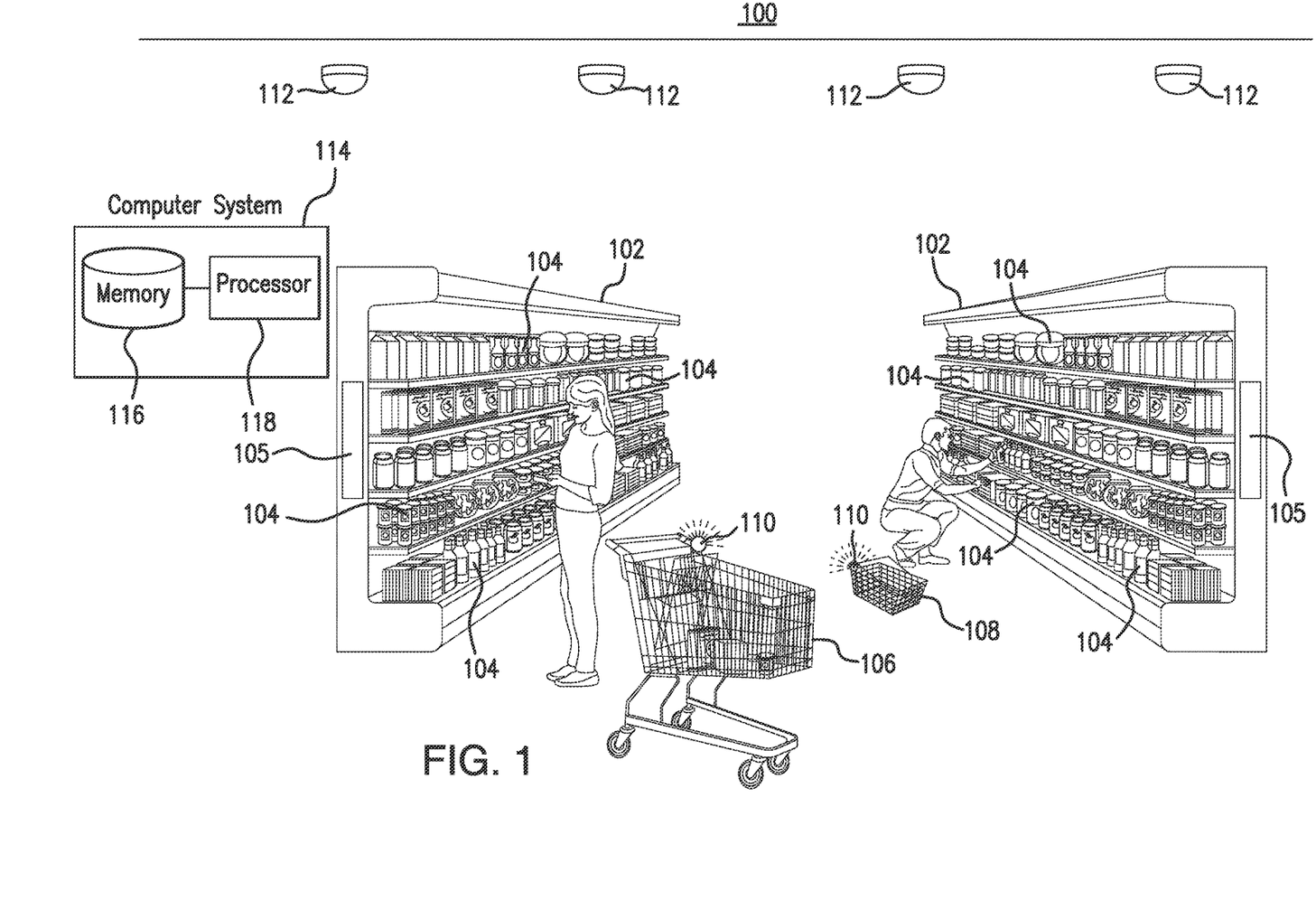
FIG. 1 illustrates an example system.

FIG. 1 illustrates an example system 100. The system 100 may be a store (e.g., a grocery store). As seen in FIG. 1, the system 100 includes one or more shelves 102 that hold one or more items 104. Shoppers in the system 100 may use a shopping cart 106 or a shopping basket 108 to hold items 104. The shopping cart 106 and the shopping basket 108 have a light 110 attached to the shopping cart 106 or the shopping basket 108. One or more cameras 112 are positioned above the shoppers in the system 100. Additionally, the system 100 includes a computer system 114 that uses information from other components in the system 100, to provide a frictionless shopping experience for the shoppers. In particular embodiments, the system 100 reduces the amount of hardware and computing resources needed to implement the frictionless shopping experience by monitoring light signals emitted by the lights 110 to track the positions of shoppers within the system 100.

The shelves 102 are arranged throughout the system 100 allowing space between the shelves 102 for shoppers to move. The shelves 102 may include any suitable types of shelves (e.g., dry good shelves, produce shelves, cold storage shelves, and refrigerated or freezer shelves). The shelves 102 may hold one or more items 104. The shoppers may approach the shelves 102 and take one or more items 104 from those shelves 102. Items 104 may be held or placed in certain areas of the system 100. For example, the items 104 may be located on the shelf 102, in a case, in an open space, in a drum, in a barrel, or in a basket. The shoppers may approach these areas and take one or more items 104.

In some embodiments, the shelves 102 (or other areas) may be equipped with weight sensors 105 that detect when the weight of a shelf 102 changes. For example, when a shopper removes an item 104 from a shelf 102, the weight sensor 105 may detect a reduction in the weight of the shelf 102, which indicates to the system 100 that an item 104 has been removed from the shelf 102. As the shoppers move throughout the system 100, the shoppers may push or carry the shopping cart 106 or the shopping basket 108. When the shopper removes an item 104 from a shelf 102, the shopper may place the item 104 into the shopping basket 106 or the shopping cart 108. The lights 110 are attached to the shopping carts 106 and the shopping baskets 108. The lights 110 emit light signals that may be used to track the locations of the shopping carts 106 and shopping baskets 108 in the system 100. In some embodiments, the lights 110 are infrared lights that emit infrared light signals. The shoppers may not be able to see the infrared light signals emitted by the lights 110, but other components within the system 100 can detect the infrared light signals. As a result, the infrared lights do not disrupt the shopping experience for the shoppers.

The lights 110 may emit light signals with a particular light pattern that uniquely identifies the shopping cart 106 or the shopping basket 108 in the system 100. For example, different lights 110 on different shopping carts 106 or shopping baskets 108 may blink with different frequencies or patterns. These patterns may be detected by other components in the system 100 (e.g., the cameras 112 and the computer system 114) to identify the shopping cart 106 or the shopping basket 108. Additionally, the intensity or luminosity of the emitted light signals may be adjusted so that the lights 110 on different shopping carts 106 or shopping baskets 108 do not interfere with each other. In this manner, the light signals emitted by different shopping carts 106 and shopping baskets 108 may be easily distinguished from each other in the system 100 even when two lights 110 are physically close to each other.

The cameras 112 are positioned above the shoppers in the system 100. In some embodiments, the cameras 112 are arranged in an array on the ceiling of the system 100. The cameras 112 are directed downwards towards the shoppers such that the cameras 112 detect the light signals emitted by the lights 110 that are attached to the shopping carts 106 and the shopping baskets 108. Each camera 112 may be responsible for detecting light signals emitted in a particular area of the system 100. Thus, when a camera 112 detects a light signal emitted from a shopping cart 106 or a shopping basket 108, the location of that camera 112 in the array may provide an approximation of the location of the shopping cart 106 or the shopping basket 108 in the system 100. In some embodiments, the cameras 112 can also capture or record a video of a particular location within the system 100 as well as detect infrared light signals emitted within the system 100.

The computer system 114 uses information from the system 100 to provide a frictionless shopping experience for the shoppers. As seen in FIG. 1, the computer system 114 includes a memory 116 and a processor 118, which perform any of the functions or actions of the computer system 114 described herein. In some embodiments, the computer system 114 may include servers or terminals located within the system 100. For example, the system 100 may be a store that includes a room in the back of the store that stores the servers and terminals that form the computer system 114.

The memory 116 may store, either permanently or temporarily, data, operational software, or other information for the processor 118. The memory 116 may include any one or a combination of volatile or non-volatile local or remote devices suitable for storing information. For example, the memory 116 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 116, a disk, a CD, or a flash drive. In particular embodiments, the software may include an application executable by the processor 118 to perform one or more of the functions described herein.

The processor 118 is any electronic circuitry, including, but not limited to one or a combination of microprocessors, microcontrollers, application specific integrated circuits (ASIC), application specific instruction set processor (ASIP), and/or state machines, that communicatively couples to memory 116 and controls the operation of the computer system 114. The processor 118 may be 8-bit, 16-bit, 32-bit, 64-bit or of any other suitable architecture. The processor 118 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 118 may include other hardware that operates software to control and process information. The processor 118 executes software stored on the memory 116 to perform any of the functions described herein. The processor 118 controls the operation and administration of the computer system 114 by processing information (e.g., information received from the weight sensors 105, cameras 112, and memory 116). The processor 118 is not limited to a single processing device and may encompass multiple processing devices.

The computer system 114 may receive signals from one or more components within the system 100. For example, the computer system 114 may receive signals from weight sensors 105 disposed within the shelves 102. When a weight sensor 105 detects a reduction in the weight of a shelf 102, the weight sensor 105 communicates a signal to the computer system 114. The computer system 114 analyzes the signal to determine whether an item 104 was removed from the shelf 102. As another example, the computer system 114 receives signals from the cameras 112. The computer system 114 may analyze the signals from the cameras 112 to determine whether light signals emitted by the lights 110 have been captured by the cameras 112.

In an example operation, one or more shoppers may be moving around the system 100 with their shopping carts 106 or shopping baskets 108. As the shoppers move around the system 100, the lights 110 attached to the shopping carts 106 or shopping baskets 108 emit infrared light signals. When a shopper approaches a shelf 102 and removes an item 104 from the shelf 102, the weight sensor 105 disposed in the shelf 102 detects a reduction in the weight of the shelf 102 and communicates a signal to the computer system 114. The computer system 114 analyzes the signal and determines that an item 104 has been removed from the shelf 102. This triggers the computer system 114 to determine which shopper in the system 100 removed the item 104 from the shelf 102.

The computer system 114 analyzes signals from the cameras 112 in the camera array positioned above the shoppers in the system 110 to determine which shopper removed the item 104 from the shelf 102. Specifically, the computer system 114 may analyze signals from the cameras 112 near or around the shelf 102 from which the item 104 was removed. These cameras 112 may capture or detect an infrared light signal emitted near the shelf 102 from which the item 104 was removed.

The cameras 112 may communicate signals to the computer system 114. The computer system 114 analyzes the signals to determine the light signal emitted near the shelf 102. The computer system 114 may determine a specific light pattern in the emitted infrared light signal. The computer system 114 determines this pattern and identifies a particular shopping cart 106 or shopping basket 108 assigned to that pattern. Based on the identified shopping cart 106 or shopping basket 108, the computer system 114 identifies the shopper that removed the item 104 from the shelf 102. The computer system 114 then assigns the item 104 to a virtual basket or cart of the shopper. When the shopper leaves the system 100, the computer system 114 automatically charges the shopper for the item 104. By tracking the position of the shopping carts 106 or shopping baskets 108 using the emitted light signals, the computer system 114 reduces the amount of hardware and computing resources needed to implement a frictionless shopping experience relative to conventional systems in which computer vision is used to track the movements and actions of shoppers.

In some embodiments, the computer system 114 uses traditional computer vision techniques to verify the determinations made by the computer system 114. For example, the computer system 114 may receive videos captured or recorded by the cameras 112 in the system 100. These videos may show the shoppers near the shelves 102. The computer system 114 may use computer vision techniques to analyze the movements and actions of the shoppers in the videos to verify which shopper removed an item 104 from a shelf 102. The computer system 114 may rely on the videos from the cameras 112 only when the computer system 114 is unable to reliably determine which shopper removed an item 104 from a shelf 102 based solely on the light signals emitted from the shopping carts 106 or shopping baskets 108. In this manner, the computer system 114 uses computer vision techniques sparingly, which reduces the hardware and computing resources needed to provide the frictionless shopping experience.

Specifically, the computer system 114 uses less computing resources to track emitted infrared light signals relative to using traditional computer vision techniques to track the movements and actions of shoppers within the system 100. Additionally, the computer system 114 need not continuously track the shoppers within the system 100. Rather, the computer system 114 may determine the positions of the shoppers within the system 100 when a triggering event occurs (e.g., when an item 104 is removed from a shelf 102).

Figure 2:
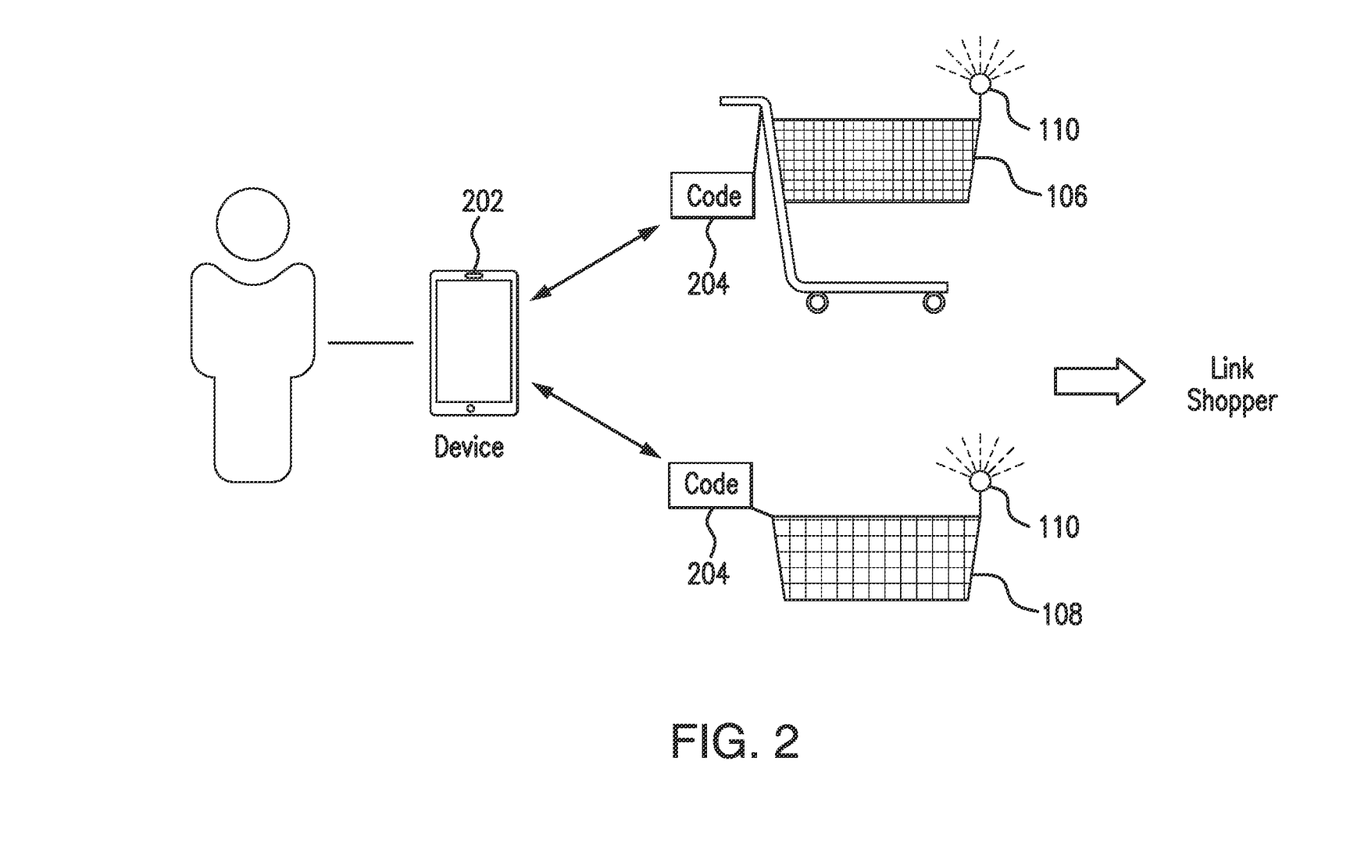
FIG. 2 illustrates an example shopper linking in the system of FIG. 1.

FIG. 2 illustrates an example shopper linking in the system 100 of FIG. 1. During shopper linking a shopper is assigned to a particular shopping cart 106 or shopping basket 108. As seen in FIG. 2, the shopper uses a device 202 to be assigned to a shopping cart 106 or shopping basket 108. The device 202 may be a personal device of the shopper (e.g., a mobile phone of the shopper). The shopper may log into an account using the device 202. The shopper may then use the device 202 to be assigned to a particular shopping cart 106 or shopping basket 108.

In some embodiments, the shopper uses the device 202 to scan a code 204 attached to a shopping cart 106 or a shopping basket 108. For example, the shopper may approach a particular shopping cart 106 or shopping basket 108 and use the device 202 to scan the code 204 attached to the shopping cart 106 or shopping basket 108. The code 204 may be a barcode or QR code. After scanning the code 204, the device 202 may communicate the scanned code 204 to the computer system 114. The computer system 114 then links the shopping cart 106 or the shopping basket 108 assigned to the code 204 to the shopper. As a result, when the computer system 114 identifies the shopping cart 106 or the shopping basket 108 using the light signal emitted by the light 110 attached to the shopping cart 106 or the shopping basket 108, the computer system 114 may determine the shopper that is linked to the identified shopping cart 106 or shopping basket 108. Thus, when the computer system 114 determines that a shopping cart 106 or shopping basket 108 was near a shelf 102 from which an item 104 was removed, the computer system 114 may determine the shopper assigned to that shopping cart 106 or shopping basket 108, and assign the removed item 104 to the account of that shopper.

Figure 3:
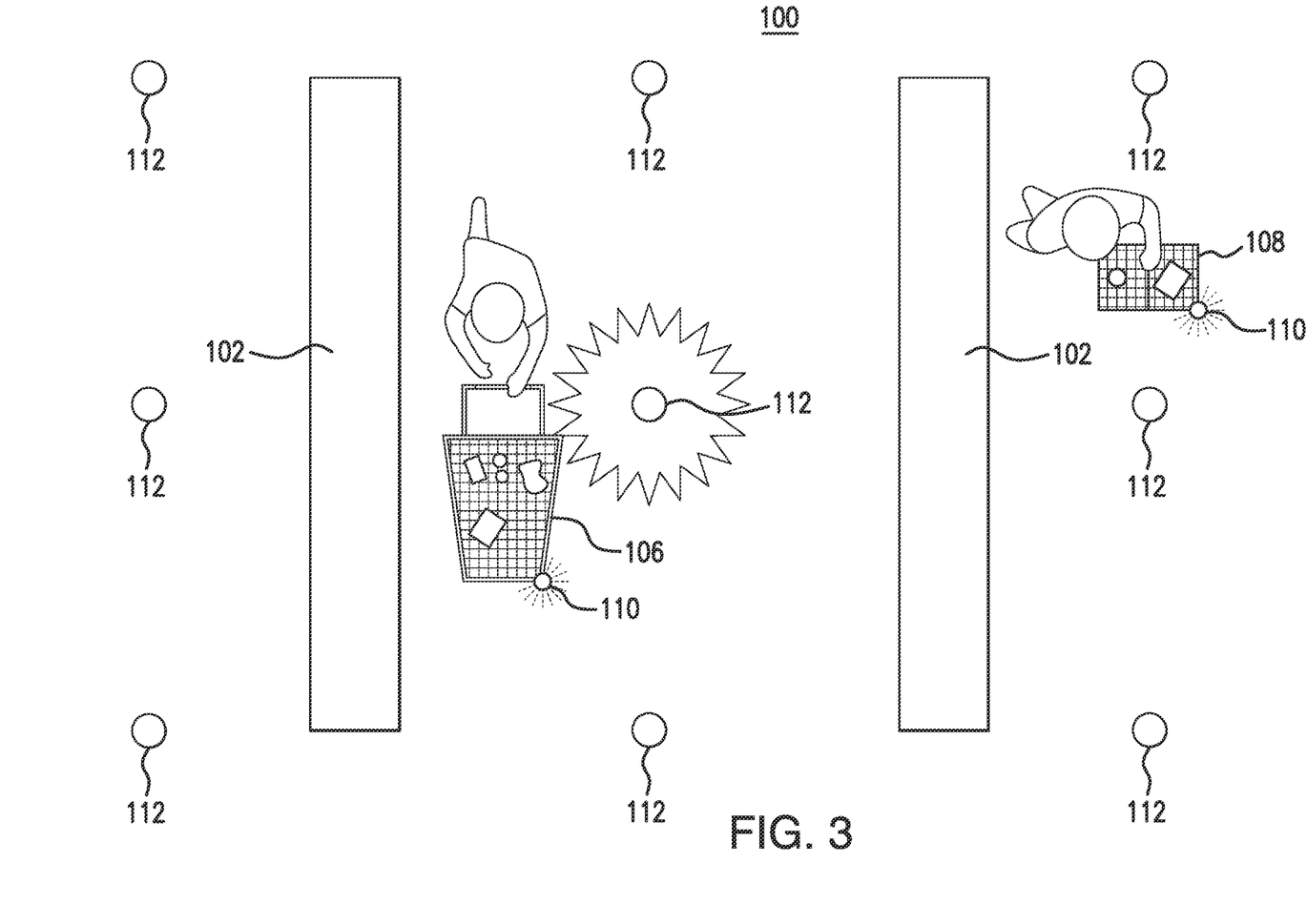
FIG. 3 illustrates an example light signal detection in the system of FIG. 1.

FIG. 3 illustrates an example light signal detection in the system 100 of FIG. 1. FIG. 3 provides a top down view of the system 100. As seen in FIG. 3, multiple cameras 112 are positioned in an array above the shoppers in the system 100. The cameras 112 may be directed downwards towards the shoppers in the system 100.

In the example of FIG. 3, two shoppers are in the system 100. The first shopper is using a shopping cart 106 and the other shopper is using a shopping basket 108. The shopper with the shopping cart 106 removes an item from a shelf 102 near that shopper. When that shopper removes the item, a triggering event may occur. For example, a weight sensor disposed in that shelf 102 may register a weight reduction in that shelf 102. The weight sensor may then communicate a signal to the computer system 114. The computer system 114 analyzes that signal to determine that an item was removed from that shelf 102.

The computer system 114 then analyzes signals from the cameras 112 in the camera array positioned above the shoppers. For example, the computer system 114 may analyze signals from the cameras 112 to determine which cameras 112 detect an emitted light signal. These light signals may be emitted by the lights 110 attached to the shopping cart 106 and the shopping basket 108. Based on the signals from the cameras 112, the computer system 114 may identify the cameras 112 that have detected emitted light signals. Then, based on the locations of these cameras 112 in the array, the computer system 114 may determine the approximate locations of the lights 110 that emitted the light signals. As a result, the computer system 114 may detect the approximate locations of the shopping cart 106 and the shopping basket 108 in the system 100. Based on these locations, the computer system 114 may determine the shopping cart 106 or shopping basket 108 of the shopper who removed the item from the shelf 102. For example, the computer system 114 may determine the shopping cart 106 or shopping basket 108 that was closest to the shelf 102 that registered the weight reduction. The computer system 114 may then determine the shopper assigned to that shopping cart 106 or shopping basket 108 and determine that that shopper removed the item from the shelf 102.

As another example, the computer system 114 may determine the shelf 102 that registered the weight reduction. The computer system 114 may then analyze signals from cameras 112 positioned near that shelf 102 to determine whether those cameras 112 detect an emitted light signal. The computer system 114 then analyzes signals from those cameras 112, and specifically the light signals captured by those cameras 112, to identify the shopping carts 106 or shopping baskets 108 near the shelf 102 when the item was removed from the shelf 102. The computer system 114 may then determine the shopping cart 106 or shopping basket 108 that was closest to the shelf 102 using the locations of the cameras 112 that detected the light signals emitted by the shopping cart 106 or shopping basket 108. The computer system 114 then determines the shopper assigned to the shopping cart 106 or shopping basket 108 and assigns the removed item to that shopper.

In some embodiments, the computer system 114 uses traditional computer vision techniques to analyze videos captured or recorded by the cameras 112 to verify the determination of which shopper removed the item from the shelf 102. For example, if multiple shopping carts 106 or shopping baskets 108 are near the shelf 102 from which an item was removed, the computer system 114 may use computer vision techniques to analyze videos captured or recorded by cameras 112 near the shelf 102 to monitor the actions and movements of shoppers near the shelf 102 when the item was taken. Based on this analysis, the computer system 114 may verify which shopper in that area removed the item from the shelf 102.

Figure 4:
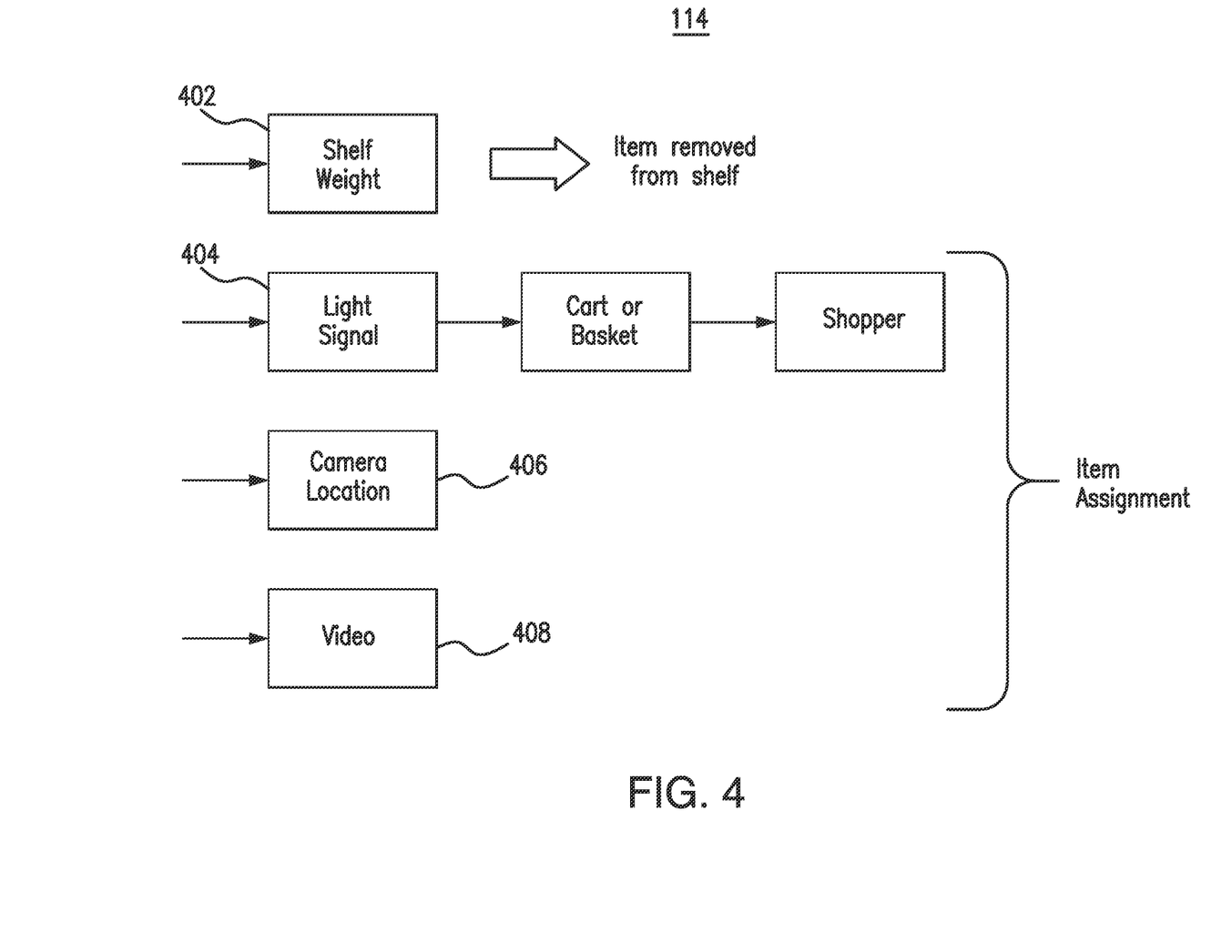
FIG. 4 illustrates an example item assignment in the system of FIG. 1.

FIG. 4 illustrates an example item assignment in the system 100 of FIG. 1. As seen in FIG. 4, the computer system 114 performs the item assignment. The computer system 114 first determines that a shelf weight 402 was reduced when an item was removed from the shelf. For example, the computer system 114 may receive signals from weight sensors disposed within the shelf. The signals may indicate a weight of the shelf. When an item is removed from the shelf, the signal may change to indicate a change or reduction in the weight. The computer system 114 may detect a change in the shelf weight 402 indicated by the signals and determine that an item was removed from the shelf.

The computer system 114 may then detect one or more light signals 404 using the cameras positioned above the shoppers in the system 100. In some embodiments, the light signals 404 are infrared light signals emitted by lights attached to the shopping carts or shopping baskets of the shoppers. Each of the light signals 404 may include a different light pattern that is linked or assigned to a particular shopping cart or shopping basket. By detecting this light pattern, the computer system 114 may determine the particular shopping cart or shopping basket with the light that emitted the detected light signal 404. As a result, the computer system 114 may identify a particular shopping cart or basket based on the detected light signal 404. After identify the shopping cart or shopping basket, the computer system 114 may identify a shopper assigned to that shopping cart or shopping basket. As discussed previously, the shopper may have used a personal device to scan a code on the shopping cart or shopping basket before the shopper began shopping. The computer system 114 may have assigned that shopper to that shopping cart or shopping basket. Using this information, the computer system 114 may subsequently identify the shopper after identifying the shopping cart or shopping basket based on the detected light signal 404.

The computer system 114 also determines a camera location 406 indicating a location of a camera that detected the emitted light signal 404. The camera location 406 may indicate a location of the camera in a camera array or a location of the camera in the system 100. The computer system 114 may use the camera location 406 to approximate the location of the emitted light signal 404 captured by the camera. In this manner, the computer system 114 approximates the location of the shopping cart, shopping basket, or the shopper in the system 100.

Using this information, the camera system 114 may determine the shopping cart, shopping basket, or the shopper that was nearest the shelf from which an item was removed. The computer system 114 may determine that that shopper removed the item from the shelf. The computer system 114 then assigns the removed item to an account of that shopper. When the shopper subsequently leaves the system 100, the computer system 114 automatically charges the shopper for that item, which provides a frictionless shopping experience for the shopper.

In some embodiments, the computer system 114 also receives and analyzes a video 408 from one or more cameras 112 in the system 100. The computer system 114 uses traditional computer vision techniques to analyze the video 408 to verify the computer system's 114 determination of which shopper removed an item from the shelf. In some instances, the computer system 114 may use the information in the video 408 to resolve conflicts in the determination of which shopper removed an item from the shelf. For example, if multiple shopping carts or shopping baskets were near the shelf when the item was removed from the shelf, then the computer system 114 may detect multiple emitted light signals 404 near the shelf. In these instances, the computer system 114 may rely on information in the video 408 to track the movements and actions of the shoppers near the shelf when the item was removed to determine which shopper removed the item from the shelf. In this manner, the computer system 114 relies on the video 408 only when needed, which reduces the amount of hardware and computing resources needed to implement the frictionless shopping experience, in certain embodiments.

Figure 5:
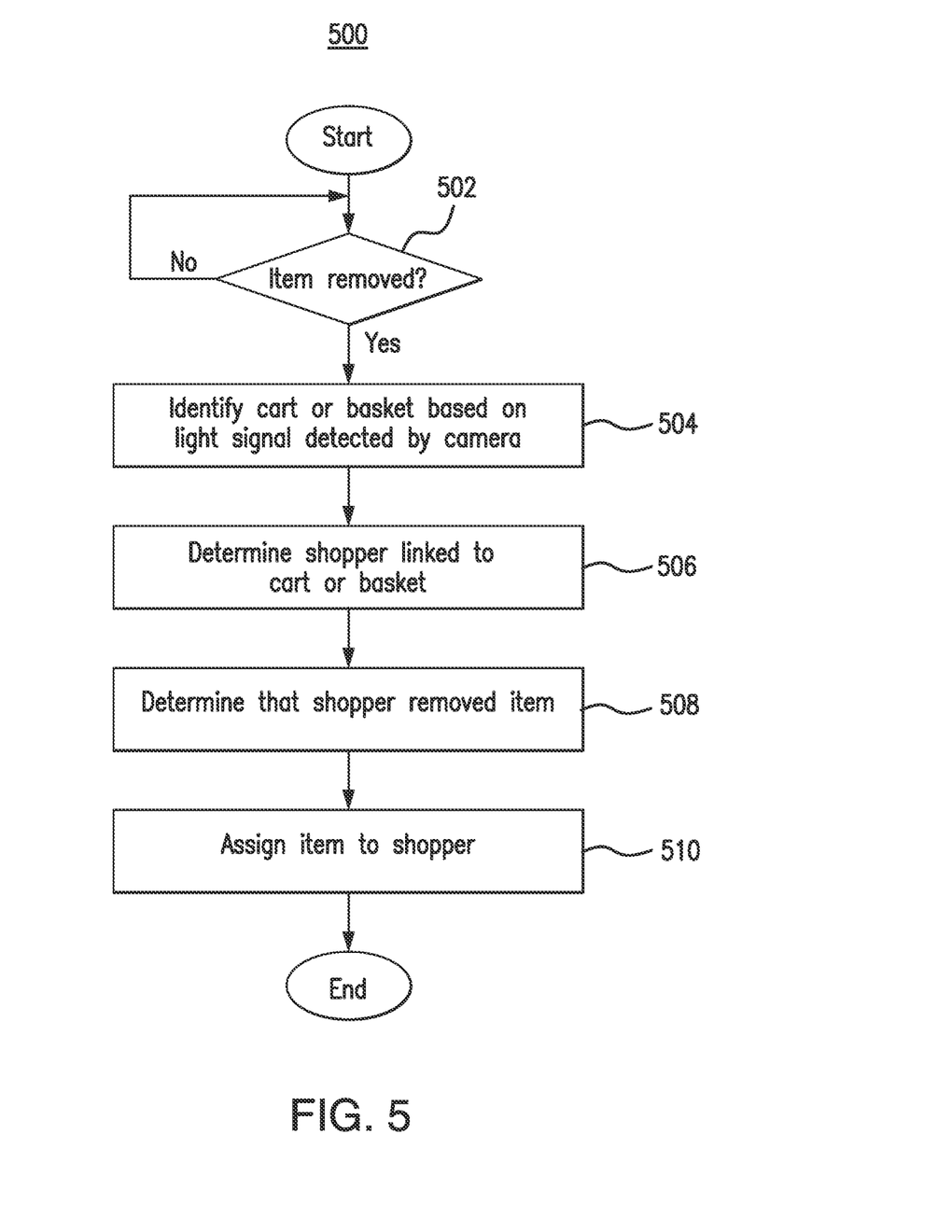
FIG. 5 is a flowchart of an example method in the system of FIG. 1.

FIG. 5 is a flowchart of an example method 500 in the system 100 of FIG. 1. In particular embodiments, the computer system 114 performs the method 500. By performing the method 500, the computer system 114 reduces the amount of hardware and computing resources needed to implement a frictionless shopping experience relative to other systems that rely solely on computer vision techniques to monitor or track the movement and actions of shoppers.

In block 502, the computer system 114 determines whether an item 104 was removed from a shelf 102. The computer system 114 may make this determination by monitoring signals from weight sensors 105 disposed within the shelves 102. When the item 104 is removed from the shelf 102, the weight sensor 105 in the shelf 102 may communicate a signal indicating a reduction in the weight of the shelf 102. When the computer system 114 receives and analyzes this signal, the computer system 114 may determine that the item 104 was removed from the shelf 102. In some embodiments, the computer system 114 is a trigger-based computer system 114 that does not perform the rest of the method 500 until the computer system 114 detects that an item 104 was removed from the shelf 102.

In block 504, the computer system 114 identifies a shopping cart 106 or shopping basket 108 based on a light signal detected by a camera 112. As discussed previously, multiple cameras 112 may be positioned in an array above the shoppers. These cameras 112 may be directed downwards at the shoppers. The cameras 112 may detect light signals (e.g., infrared light signals) emitted by lights 110 attached to shopping carts 106 or shopping baskets 108 of the shoppers. These light signals may include different light patterns that identify the shopping carts 106 or shopping baskets 108. The cameras 112 may detect the light signals emitted by the lights 110 and communicate signals to the computer system 114 indicating these light signals. The computer system 114 analyzes these light signals and detects the light patterns within these light signals to identify the shopping carts 106 or shopping baskets 108 detected by the cameras 112.

In one example, the computer system 114 analyzes signals from the cameras 112 positioned in the array near the shelf 102 from which the item 104 was removed. The computer system 114 analyzes the signals from these cameras 112 to identify the shopping carts 106 or shopping baskets 108 near the shelf 102 when the item 104 was removed. In another example, the computer system 114 analyzes signals from the cameras 112 in the array. Some of the cameras 112 may capture or detect emitted light signals. The computer system 114 then determines the locations or positions of these cameras 112 in the array to approximate the locations of the shopping carts 106 or shopping baskets 108 that emitted the detected light signals.

In block 506, the computer system 114 determines a shopper linked to the shopping cart or shopping basket. The shopper may have used a personal device 202 to scan a code 204 attached to the shopping cart 106 or shopping basket 108 before the shopper began shopping. When the shopper scanned the code 204, the personal device 202 may have communicated the code to the computer system 114. The computer system 114 then links an account of the shopper to the shopping cart 106 or shopping basket 108 assigned to the scanned code 204. When the computer system 114 subsequently identifies a shopping cart 106 or shopping basket 108 using the light signals emitted by the lights 110 attached to the shopping cart 106 or shopping basket 108, the computer system 114 may also identify the shopper linked to the shopping cart 106 or shopping basket 108.

In block 508, the computer system 114 determines that the shopper removed the item 104 from the shelf 102. The computer system 114 may have made this determination based on the shopper being assigned to the shopping cart 106 or the shopping basket 108 that was closest to the item 104 when the item 104 was removed from the shelf 102. In certain embodiments, if there were multiple shoppers near the item 104 when the item 104 was removed from the shelf 102, the computer system 114 may use traditional computer vision techniques to analyze videos from the cameras 112 to determine the movements and actions of the shoppers near the item 104 when the item 104 is removed from the shelf 102. Based on these videos, the computer system 114 may determine the shopper that removed the item 104 from the shelf 102.

In block 510, the computer system 114 assigns the item 104 that was removed from the shelf 102 to the shopper. For example, the computer system 114 may add the item to a virtual cart or basket of the shopper. When the shopper subsequently leaves the system 100, the computer system 114 automatically charges the shopper for the item 104, which provides a frictionless shopping experience for the shopper.

In summary, a computer system 114 implements a frictionless shopping system using a light emission and detection feature to monitor and track shoppers. Generally, shopping carts 106 and shopping baskets 108 in a store are equipped with a light 100 (e.g., a light emitting diode) that emits light signals (e.g., infrared light signals) that identify the shopping cart or basket. A camera array positioned on the ceiling of the store detects the emitted light signals and indicates these detected light signals to the computer system 114. The computer system 114 deciphers the light signals to identify the shopping cart 106 or basket 108 and the shopper linked to that shopping cart 106 or basket 108. Then, based on the location of the camera 112 in the camera array that detected the light signal, the computer system 114 determines the approximate location of the shopper in the store.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Embodiments of the present disclosure may include a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method comprising:
    emitting a first light signal from a first cart;
    detecting, using a processor, that an item was removed from a first area;
    detecting, by a first camera positioned above and separate from the first cart, the first light signal emitted from the first cart;
    detecting, by a second camera positioned above and separate from a second cart, a second light signal emitted from the second cart;
    identifying the first cart, that is detected by the first camera, based on the first light signal;
    determining, using the processor, based on the identified first cart, a shopper linked to the first cart;
    determining, using the processor, that a first location of the first camera is closer to the first area than a second location of the second camera;
    responsive to determining that the first location is closer to the first area than the second location, determining, using a processor, that the first cart is closer to the first area than the second cart;
    determining, using the processor, based at least in part on determining that the first cart is closer to the first area than the second cart, that the shopper removed the item from the first area; and
    assigning, using the processor, the item to the shopper.

2. The method of claim 1, wherein the first light signal is an infrared light signal emitted by a light emitting diode attached to the first cart.

3. The method of claim 1, wherein the first light signal comprises a light pattern that identifies the first cart.

4. The method of claim 1, further comprising:
receiving a scanned code from a device of the shopper; and
linking, using the processor, the shopper to the first cart based on the scanned code.

5. The method of claim 1, wherein the first area is a shelf, and wherein detecting that the item was removed comprises detecting, by a weight sensor, that a weight of the shelf was reduced.

6. The method of claim 1, further comprising receiving a video of the shopper, wherein determining that the shopper removed the item from the first area is further based on the video.

7. The method of claim 6, wherein tracking the shopper based on the video is in response to the item being removed from the first area.

8. A system comprising:
a first cart with a first light arranged to emit a first light signal;
a second cart with a second light arranged to emit a second light signal an item;
a first camera arranged to detect the first light signal, wherein the first camera is positioned above and separate from the first cart;
a second camera arranged to detect the second light signal, wherein the second camera is positioned above and separate from the second cart;
a memory; and
a hardware processor communicatively coupled to the memory, the hardware processor configured to:
detect that the item was removed from a first area;
identify the first cart based on the first light signal detected by the first camera;
determine, based on the identified first cart, a shopper linked to the first cart;
determine that a first location of the first camera is closer to the first area than a second location of the second camera;
in response to determining that the first location is closer to the first area than the second location, determine that the first cart is closer to the first area than the second cart;
determine, based at least in part on determining that the first cart is closer to the first area than the second cart, that the shopper removed the item from the first area; and
assigning the item to the shopper.

9. The system of claim 8, wherein the first light is a light emitting diode attached to the first cart and the first light signal is an infrared light signal.

10. The system of claim 8, wherein the first light signal comprises a light pattern that identifies the first cart.

11. The system of claim 8, wherein the hardware processor is further configured to:
receive a scanned code from a device of the shopper; and
link the shopper to the first cart based on the scanned code.

12. The system of claim 8, wherein the first area is a shelf, and wherein detecting that the item was removed comprises detecting, by a weight sensor, that a weight of the shelf was reduced.

13. The system of claim 8, wherein the hardware processor is further configured to receive a video of the shopper, wherein determining that the shopper removed the item from the first area is further based on the video.

14. The system of claim 13, wherein tracking the shopper based on the video responsive to the item being removed from the first area.

15. A non-transitory computer readable medium storing instructions that, when executed by a hardware processor, cause the hardware processor to:
link a first cart to a shopper, wherein the first cart is identified by a first light signal emitted from the first cart;
detect that an item was removed from a first area;
receive, from a first camera, an indication of the first light signal emitted from the first cart, wherein the first camera is positioned above and separate from the first cart;
receive, from a second camera positioned above and separate from a second cart, a second light signal emitted from the second cart;
identify the first cart, that is detected using the first camera, based on the indication of the first light signal;
determine, based on the identified first cart, the shopper linked to the first cart;
determine that a first location of the first camera is closer to the first area than a second location of the second camera;
responsive to determining that the first location is closer to the first area than the second location, determine that the first cart is closer to the first area than the second cart; and
responsive to determining that the first cart is closer to the first area than the second cart, assign the item to the shopper.

16. The non-transitory computer readable medium of claim 15, wherein the first light signal is an infrared light signal emitted by a light emitting diode attached to the first cart.

17. The non-transitory computer readable medium of claim 15, wherein the first light signal comprises a light pattern that identifies the first cart.

18. The non-transitory computer readable medium of claim 15, wherein the instructions, when executed, cause the hardware processor to further:
receive a scanned code from a device of the shopper; and
link the shopper to the first cart based on the scanned code.

19. The non-transitory computer readable medium of claim 15, wherein the first area is a shelf, and wherein detecting that the item was removed comprises detecting, by a weight sensor, that a weight of the shelf was reduced.

20. The non-transitory computer readable medium of claim 15, wherein the instructions, when executed, cause the hardware processor to further receive a video of the shopper, wherein determining that the shopper removed the item from the first area is further based on the video.

* * * * *